(12) United States Patent
Saito et al.

(10) Patent No.: US 8,491,442 B2
(45) Date of Patent: Jul. 23, 2013

(54) CONTROL APPARATUS AND METHOD FOR CONTROLLING A HYBRID VEHICLE

(75) Inventors: Masakazu Saito, Yamato (JP); Munetoshi Ueno, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 453 days.

(21) Appl. No.: 12/920,374

(22) PCT Filed: Feb. 27, 2009
(Under 37 CFR 1.47)

(86) PCT No.: PCT/IB2009/000374
§ 371 (c)(1),
(2), (4) Date: Jan. 11, 2011

(87) PCT Pub. No.: WO2009/109825
PCT Pub. Date: Sep. 11, 2009

(65) Prior Publication Data
US 2011/0174559 A1 Jul. 21, 2011

(30) Foreign Application Priority Data
Mar. 3, 2008 (JP) .................................. 2008-052428

(51) Int. Cl.
*B60W 10/02* (2006.01)
*B60W 10/04* (2006.01)

(52) U.S. Cl.
USPC .............................................. 477/6; 477/174

(58) Field of Classification Search
USPC .. 477/5, 6, 111, 115, 118, 166, 174; 903/903, 903/906, 907, 912, 946; 180/65.245, 65.275, 180/65.285
See application file for complete search history.

(56) References Cited

U.S. PATENT DOCUMENTS

| | | | |
|---|---|---|---|
| 6,908,413 B2 * | 6/2005 | Ayabe et al. | 477/109 |
| 7,670,257 B2 * | 3/2010 | Popp et al. | 477/6 |
| 2005/0155803 A1 | 7/2005 | Schiele | |
| 2006/0243501 A1 | 11/2006 | Hidaka | |
| 2012/0184407 A1 * | 7/2012 | Gentile et al. | 477/118 |
| 2013/0124027 A1 * | 5/2013 | Tanishima et al. | 701/22 |

FOREIGN PATENT DOCUMENTS

| | | |
|---|---|---|
| DE | 3335923 A1 | 9/1984 |
| JP | 2000-314474 A | 11/2000 |
| JP | 2000-320582 A | 11/2000 |
| JP | 2002-144921 | 5/2002 |
| JP | 2004-162534 A | 6/2004 |
| JP | 2005-221073 A | 8/2005 |
| JP | 2006-306328 A | 11/2006 |

* cited by examiner

*Primary Examiner* — Justin Holmes
(74) *Attorney, Agent, or Firm* — Young Basile

(57) ABSTRACT

A hybrid vehicle is taught herein in which a clutch is disposed between an engine and a motor/generator and disengagement of the clutch is controlled in a coasting drive while dragging the engine. A drive controller engages the clutch so that the vehicle coasts while dragging the engine at a time of coasting deceleration. While coasting, when the stepped transmission of the hybrid vehicle downshifts, the clutch is disengaged during the downshift.

17 Claims, 6 Drawing Sheets

CONTROL APPARATUS AND METHOD FOR CONTROLLING A HYBRID VEHICLE

CROSS-REFERENCE TO RELATED APPLICATIONS

This application claims priority from Japanese Patent Application Serial No. 2008-052428, filed Mar. 3, 2008, which is incorporated herein in its entirety by reference.

TECHNICAL FIELD

The present invention relates to controlling a hybrid vehicle.

BACKGROUND

A known hybrid vehicle has an engine, a motor/generator (MG) used for driving, starting of the engine and power generation, and a clutch that is disposed between the engine and the motor/generator. When such a hybrid vehicle coasts, a fuel supply to the engine is stopped and the clutch is disengaged so the engine is isolated from a drive transmission and the motor/generator. With this operation, there is no loss of electrical energy regeneration due to engine friction during a deceleration regenerative power generation by the motor/generator, and a regenerative power amount is secured fully and efficiently. In such a hybrid vehicle, for instance, when the hybrid vehicle coasts down a long hill with an accelerator pedal released by a driver, the MG is used as the generator, and a frequency or the number of occurrences of recovering electricity by performing the regenerative power generation increases.

In this situation, it is conceivable that a situation will often occur in which a battery that stores the regenerative power or electricity becomes fully charged. That is, it is conceivable that a case will often occur where a state of charge (SOC) of the battery exceeds a specified value, and regeneration becomes impossible. Thus, in the case where the SOC exceeds the specified value, in order to prevent an overcharge of the battery, a regenerative braking by the MG is controlled or restrained (or suppressed). For this case where the regenerative braking is restrained even though the driver releases the accelerator pedal, there are systems such as those taught in Japanese Patent Provisional Publication Nos. 2004-162534 and 2006-306328 in which a clutch arranged between the engine and the motor is engaged, and the deceleration is performed by the engine friction. In addition, a system with a stepped transmission in such hybrid vehicle provided with two clutches has also been disclosed in, for example, Japanese Patent Provisional Publication No. 2005-221073.

BRIEF SUMMARY

Embodiments of the invention control disengagement of a clutch of a hybrid vehicle while coasting. The hybrid vehicle includes an engine, a motor/generator, a first clutch that transmits and disconnects torque between the engine and the motor/generator by engagement and disengagement of the first clutch and an automatic transmission disposed between the motor/generator and a driving wheel. According to one exemplary embodiment of the invention, a control apparatus for the hybrid vehicle comprises a controller configured to maintain engagement of the first clutch to perform a vehicle coasting drive while dragging the engine at a time of coasting deceleration, control the automatic transmission to perform a downshift process and disengage the first clutch during the downshift process.

Details and variations of this embodiment and others are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

In hybrid vehicle systems described in Japanese Patent Provisional Publication Nos. 2004-162534, 2006-306328 and 2005-221073, where the hybrid vehicle coasts while dragging the engine with fuel cut (that is, while dragging the engine provided with no fuel) with the clutch engaged at a high SOC, there is a possibility that a greater deceleration than a target deceleration will occur under a low vehicle speed condition. In particular, in a case of a normal automatic transmission control of the vehicle with the stepped transmission, downshifts to a speed stage of large gear ratio are performed in accordance with a decrease in vehicle speed. In this situation, a case could arise in which a greater deceleration than the driver's desired deceleration is gradually produced.

To address this problem, a technique in which the clutch is disengaged or released before the deceleration becomes greater than or equal to the target deceleration has been considered by the present inventors. However, when using this technique, the deceleration can be considerably decreased or reduced depending on the gear ratio of the automatic transmission, causing a problem in which it is difficult to satisfy feeling and/or comfortableness of occupants including the driver.

According to embodiments of the invention, however, it is possible to lower the energy consumption by disengaging the first clutch while lessening the effects on vehicle behavior resulting from the clutch disengagement. In addition, it is possible to reduce the over-increased or excessive deceleration. Furthermore, and as described in additional detail hereinafter, disengaging the first clutch in synchronization with the downshift suppresses an abrupt output torque change of a propeller shaft where a contingent or uncertain friction of the engine is released, and this gives stability to the vehicle behavior. Moreover, although there is a measure of change of the vehicle behavior during the downshift, the effect caused by the behavior change can be covered or avoided by the clutch disengagement.

Figure 1:
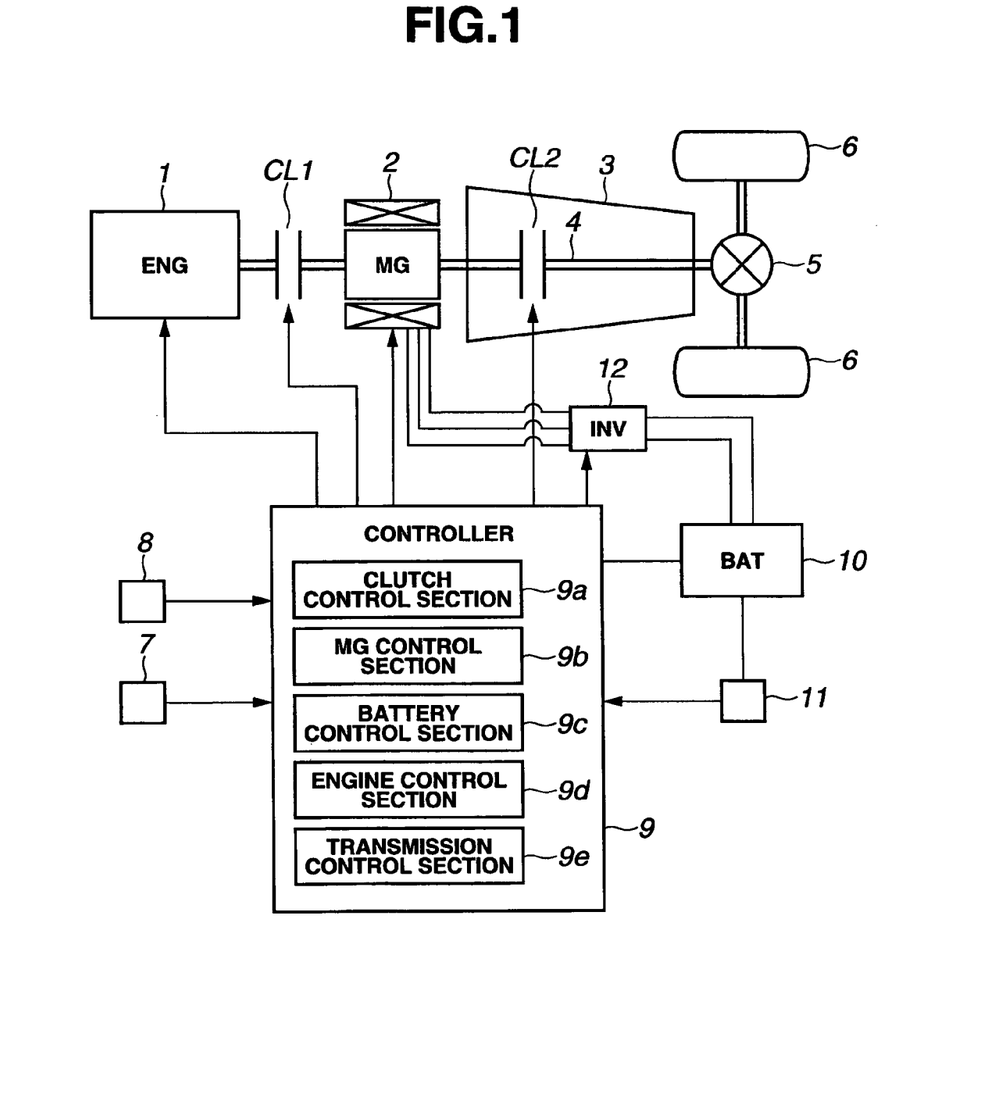
FIG. 1 is a schematic system diagram of a hybrid vehicle provided with a clutch control apparatus according to an embodiment of the invention.
Figure 2A:
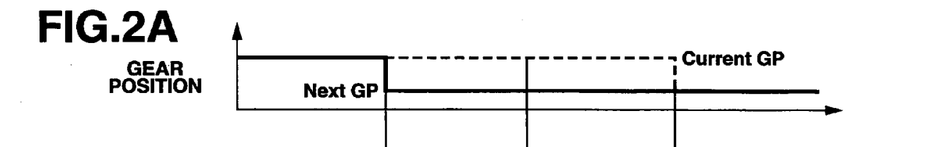
FIGS. 2A to 2E are state transition diagrams of an engine, a first clutch and a motor/generator of the hybrid vehicle according to FIG. 1.
Figures 2B, 2C:
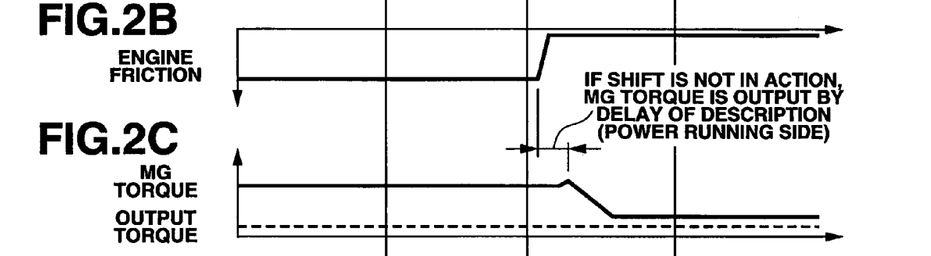
Figure 2D:
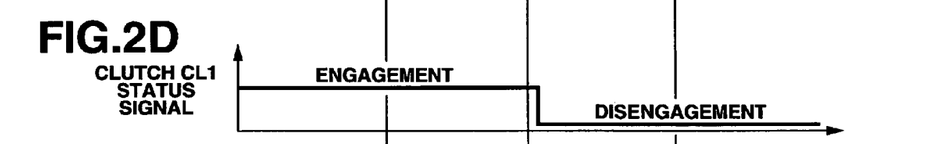
Figure 2E:
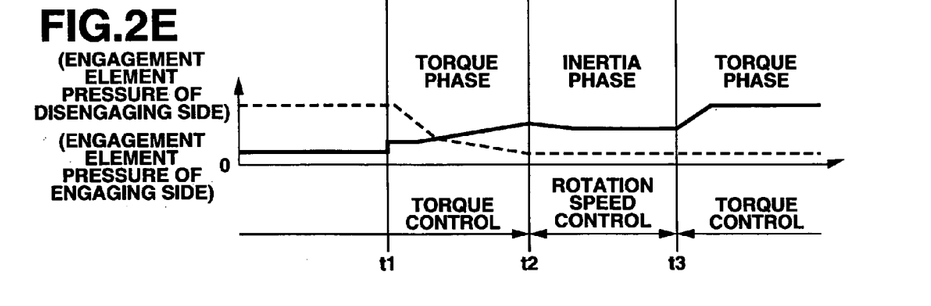

Hereinafter, certain embodiments of the invention are explained in detail with reference to the drawings. As shown in FIG. 1, the hybrid vehicle includes an engine 1, a motor/generator 2 and a transmission 3. Here, for example, the transmission 3 is a fixed ratio automatic transmission. A first clutch CL1 is disposed between the engine 1 and the motor/generator 2. The first clutch CL1 is capable of connecting and disconnecting a driving force and friction from the engine 1. The motor/generator 2 works as an electric motor when receiving power supply from a battery 10 through an inverter 12, and the motor/generator 2 functions to drive a drive wheel 6 via the transmission 3, a propeller shaft 4 and a differential gear 5. A second clutch CL2 is a clutch that is used also as a frictional engagement element for shift (here provided inside the transmission 3), and the second clutch CL2 controls transmission of torque between the motor/generator 2 and the drive wheel 6.

With respect to the motor/generator 2, when the motor/generator 2 is dragged and rotated by the driving wheel 6 through the differential gear 5, the propeller shaft 4 and the transmission 3. Also, the motor/generator 2 can work as a power generator, and the battery 10 is charged with power generated by the motor/generator 2 through the inverter 12. That is, the motor/generator 2 works as an electric motor and a power generator.

The first clutch CL1, the second clutch CL2 and the motor/generator 2 are controlled by a controller 9. With regard to the controller 9, sensors such as an accelerator position sensor 7 that detects an accelerator opening degree (APO), and a vehicle speed sensor 8 that detects a traveling speed of the vehicle, are connected to an input side of the controller 9. Further, the battery 10 is equipped with a battery sensor 11, and the battery sensor 11 measures or checks a state of charge (SOC) of the battery and sends the measured SOC to the controller 9. The controller 9 controls the engine 1, the first clutch CL1, the motor/generator 2 and the second clutch CL2 on the basis of the input signals from these sensors.

The controller 9 selects any one drive mode as a drive mode of the hybrid vehicle from the following modes: 1) an EV drive mode (electric drive mode) in which the vehicle travels by only driving force of the motor/generator (MG) 2 under a condition where the first clutch CL1 is disengaged to isolate the engine 1 and the motor/generator 2; 2) an HEV drive mode (hybrid drive mode) in which the vehicle travels by at least driving force of the engine 1 under a condition where the first clutch CL1 is engaged to connect the engine 1 and the motor/generator 2; 3) and an engine brake drive mode in which the vehicle travels while dragging the engine under a condition where the clutch CL1 is engaged to connect the engine 1 and the motor/generator 2 and fuel supply to the engine 1 is stopped. Here, "dragging the engine" means that the engine, which is provided with no fuel and produces no driving force, is rotated by the driving wheel 6 or the motor/generator 2 through the first clutch CL1. When the engine provided with no fuel is rotated by the driving wheel 6 or the motor/generator 2, the engine, having its own inertia, operates as engine braking and reduces the vehicle speed.

In the above system, in order to avoid undesirable vehicle behavior at an operation of the disengagement of the clutch CL1, an EV drive is performed in the engine brake drive mode by using assist torque of the MG 2 at a time of re-acceleration or creep driving with the clutch CL1 held engaged without disengaging the clutch CL1. However, since energy for canceling the engine brake is consumed, this may contribute to deterioration of fuel economy. Furthermore, where the engine is dragged with the clutch CL1 engaged, an extra or additional energy of an amount equivalent to the engine dragging is consumed when the reacceleration is carried out (that is, power consumption increases), and this might contribute to the deterioration of fuel economy.

On the other hand, cases often arise where acceleration is required by a small depression of an accelerator pedal, or the accelerator pedal is released again so that the acceleration requirement is cancelled by the driver in accordance with decrease of the vehicle speed due to road conditions (e.g. decrease of road grade or gradient, change of the road from downhill to flat road or uphill) and its surrounding traffic flow. That is to say, even in the case of a coasting drive, the driver maintains the vehicle speed according to the surrounding traffic flow by performing slight accelerator operations. When the engagement of the clutch CL1 is released (i.e., the clutch is disengaged), the vehicle behavior can change due to shock of the disengagement, and this causes discomfort for the occupants. Meanwhile, as described above, in the state in which the clutch CL1 is engaged and the engine is dragged at the re-acceleration, the extra or additional energy of the amount equivalent to the engine dragging is consumed.

Further, in the case of the coasting deceleration drive in the engine brake drive mode with the clutch CL1 engaged at the low vehicle speed, the system functions such that a target deceleration is produced by an amount of the engine brake, in which variations exist, and an MG assist amount. Thus, when the clutch CL1 is disengaged at re-acceleration from the deceleration state or the creep driving, since the engine brake amount is decreased as the clutch CL1 is disengaged, the MG assist amount needs decreasing. However, in such a control, due to a response delay of the system or a gap between an estimation engine brake amount and an actual engine brake amount, a problem arises in which unfavorable vehicle behavior occurs by a sense of acceleration or drop in G (gravitational acceleration). Therefore, in embodiments of the invention, the above problems are solved in the following manner.

The controller 9 has a clutch control section 9a, an MG control section 9b, a battery control section 9c, an engine control section 9d and a transmission control section 9e. The transmission control section 9e controls the transmission 3 to upshift or downshift the shift position on the basis of the input from the accelerator position sensor 7 and the vehicle speed sensor 8. The controller 9 is implemented by, for example, a conventional engine control unit such as is known in the art. It can thus be a microcomputer including a random access memory (RAM), a read-only memory (ROM) and a central processing unit (CPU), along with various input and output connections. Generally, the control functions described herein and associated with the respective control sections are performed by execution by the CPU of one or more software programs stored in ROM. Of course, some or all of the functions can be implemented by hardware components. Moreover, although several control sections are shown as being part of an integrated controller 9, the functions for the sections could be performed by a plurality of logically-linked controllers.

The MG control section 9b drives power driving and regenerative operation of the motor/generator MG according to a required driving force. The clutch control section 9a controls the engagement/disengagement of the first clutch CL1 and the second clutch CL2. The battery control section 9c receives input indicating the SOC (charge amount) of the battery 10 as measured by the battery sensor 11 and controls an amount of charge and discharge of the battery 10. When the SOC exceeds a specified threshold charge value by which the regenerative charge by power generation should be prevented, the battery control section 9c restrains or suppresses the regenerative operation (the charging), and the coasting drive in the engine brake drive mode is performed.

When the vehicle speed measured by the vehicle speed sensor 8 lowers, the transmission control section 9e downshifts the shift position of the transmission 3 to a low speed gear position (or stage) of a larger transmission ratio. Since the vehicle speed gradually lowers during the coasting drive while dragging the engine 1 with the first clutch CL1 engaged, the transmission control section 9e performs the downshift to a gear position of a still larger transmission ratio according to the decrease of vehicle speed. A force of the engine brake resulting from the engine 1 dragging with no fuel supply then increases with the downshift to the low speed gear positions. Thus, in the present embodiment, in the case of the coasting drive with the engine dragging, the first clutch CL1 is disengaged in synchronization with this downshift. With this operation, an occurrence of the excessive deceleration at the gear position of the high transmission ratio can be prevented. Further, since the disengagement of the first clutch CL1 is carried out during the downshift operation, it is also possible to suppress ill effect on the vehicle behavior to a minimum. In addition, since a vehicle is in an area or region suitable for the normal EV drive after disengaging the first clutch CL1, when acceleration is required by the driver, the EV drive can be started smoothly without additional clutch control (the engagement/disengagement operation of the clutch). Moreover, since the first clutch CL1 is already disengaged, there is no need to perform the EV drive with the engine 1 dragged, then the fuel economy is also improved.

FIGS. 2A to 2E are state transition diagrams of the engine 1, the first clutch CL1 and the motor/generator 2 of the hybrid vehicle shown in FIG. 1. In the drawings, each lateral axis indicates time, and each vertical axis indicates a system condition of the hybrid vehicle. First, at time t1, a shift signal to shift from the current gear position (Current GP) to the next gear position (Next GP) is detected. This can be, for example, judgment of a $[2^{nd} \rightarrow 1^{st}]$ downshift. Also at time t1, controlling of engaging oil pressures of the engaging elements on a disengaging side (dotted line in FIG. 2E) and an engaging side (bold line in FIG. 2E) of the second clutch CL2 of the automatic transmission AT is started. At this time point, the transmission 3 is in a torque phase, and the engine 1 and the motor/generator 2 are torque-controlled. In the time period from t1 to t2, the engaging oil pressure of the engaging elements on the disengaging side of the second clutch CL2 is decreased, and the engaging oil pressure of the engaging elements on the engaging side of the second clutch CL2 is increased.

Subsequently, at time t2, the engaging oil pressure of the engaging elements on the engaging side becomes constant, and the phase shifts to an inertia phase. The control shifts to a rotation speed control by a target rotation speed, and the first clutch CL1 is disengaged at time t2 or shortly thereafter. By the disengaging of the first clutch CL1, the engine friction becomes substantially equal to zero, and the MG assist torque is input to the automatic transmission 3 input torque until the motor/generator 2 is controlled. Then, since an output torque is controlled or adjusted to a torque equivalent to a target driving torque from time t3 at which the engaging pressure of the engaging elements on the engaging side is increased and the phase becomes the torque phase again, there is no occurrence of the torque change of the output torque caused by the disengagement of the first clutch CL1. That is, in the present embodiment, the disengagement of the first clutch CL1 is performed between time t1 and time t3 at the time of the downshift, more specifically, during the rotation speed control between time t2 and time t3.

Figure 3:
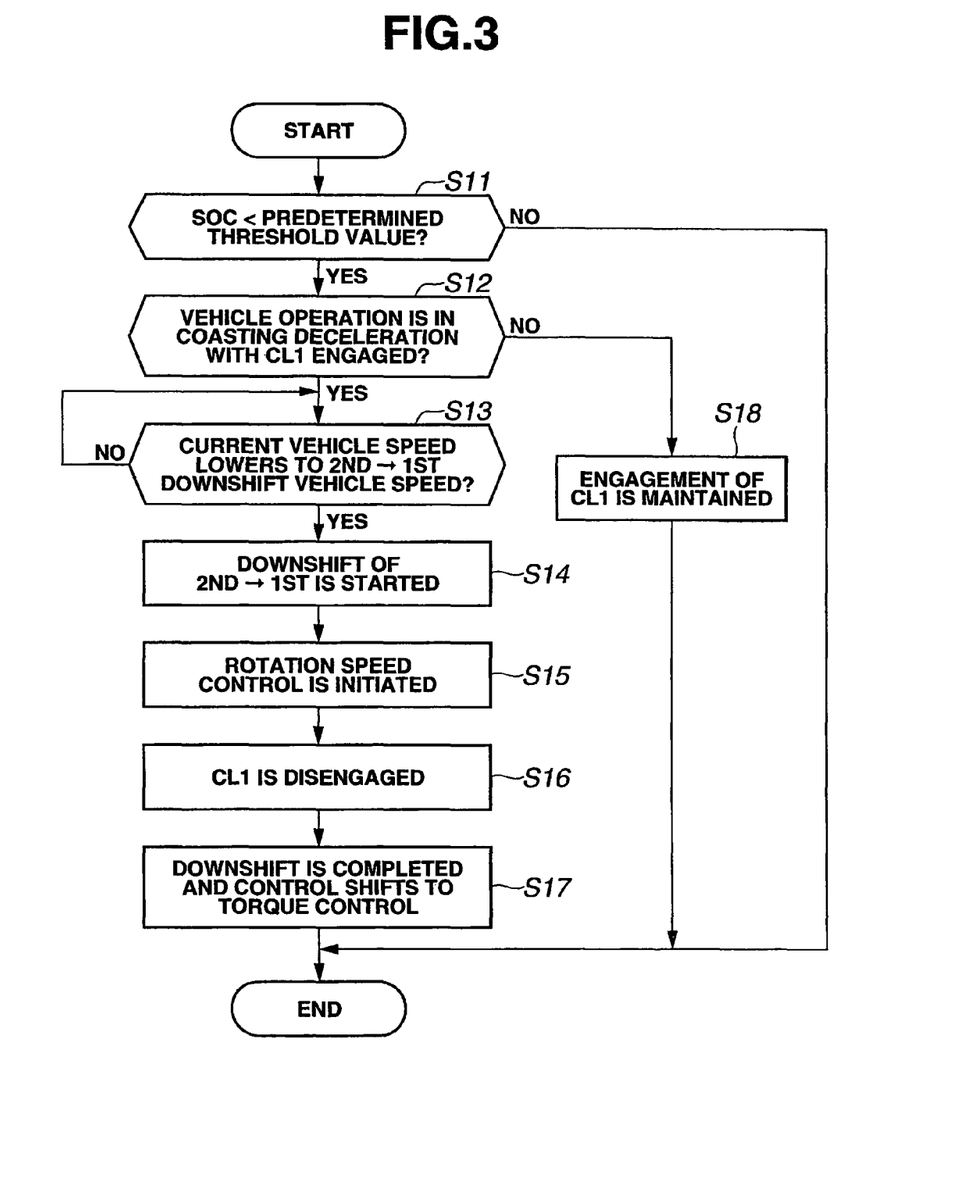
FIG. 3 is a flow chart showing a control executed by the clutch control apparatus of the hybrid vehicle according to an embodiment of the invention.

FIG. 3 is a flow chart showing one example of control executed by the controller 9 of FIG. 1. As shown in the drawing, at step S11, a judgment is made as to whether or not a measured current SOC (value expressing a state of charge of the battery or a charge amount of the battery) is smaller than a predetermined threshold value. If the current SOC is not smaller than the predetermined threshold value, the routine is terminated. If the current SOC is smaller than the predetermined threshold value, at step S12, a judgment is made as to whether or not the vehicle operation is in coasting deceleration with the first clutch CL1 engaged. More specifically, the judgment whether the first clutch CL1 is engaged can be made by information obtained from the clutch control section 9a. The judgment whether the vehicle operation is in the coasting deceleration can be made by information obtained from the accelerator position sensor 7. At step S12, on the basis of the information obtained from these clutch control section 9a and accelerator position sensor 7, the judgment is made as to whether or not the vehicle operation is in the coasting deceleration with the first clutch CL1 engaged. If the judgment condition is not satisfied, the engagement of the first clutch CL1 is maintained, and the routine is terminated. If the judgment condition is satisfied, at step S13, a judgment is made as to whether or not a current vehicle speed is smaller than or equal to a downshift vehicle speed (for example a current vehicle speed $\leq 2^{nd} \rightarrow 1^{st}$ downshift vehicle speed). Step S13 is repeated until the current vehicle speed is smaller than or equal to the downshift vehicle speed as a result of the coasting deceleration. When the current vehicle speed becomes smaller than or equal to the downshift vehicle speed, at step S14, downshift is started (from, for example $2^{nd} \rightarrow 1^{st}$). At step S15, the rotation speed control is initiated, and at step S16, the disengagement of the first clutch CL1 is performed. At step S17, the downshift is completed, and the control shifts to torque control. Afterwards, the vehicle drive shifts to a creep EV drive. With this operation, since the excessive deceleration caused by the engine dragging can be prevented, the improvement of the fuel economy can be achieved and also undesirable vehicle behavior resulting from the clutch disengagement can be suppressed.

Figure 4A:
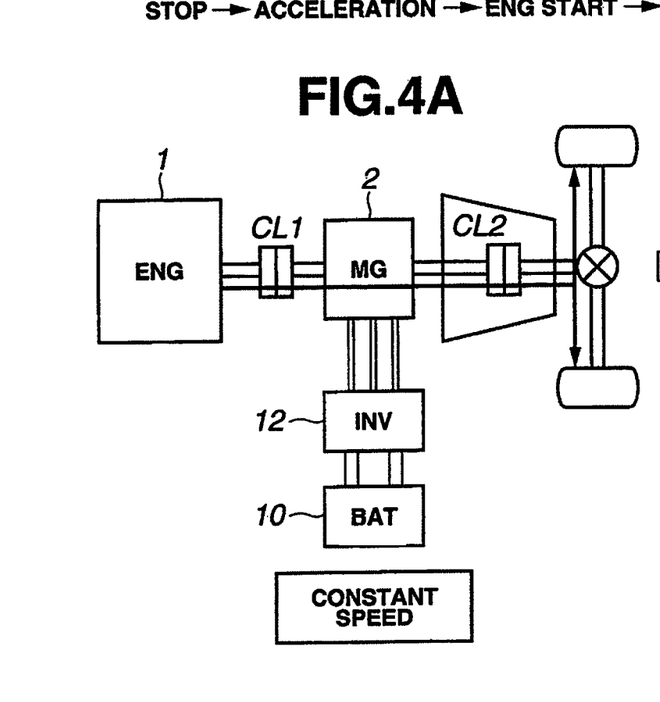
FIGS. 4A and 4B are drawings explaining engagement/disengagement of the clutch in a case where the vehicle decelerates from a constant speed.
Figure 4B:
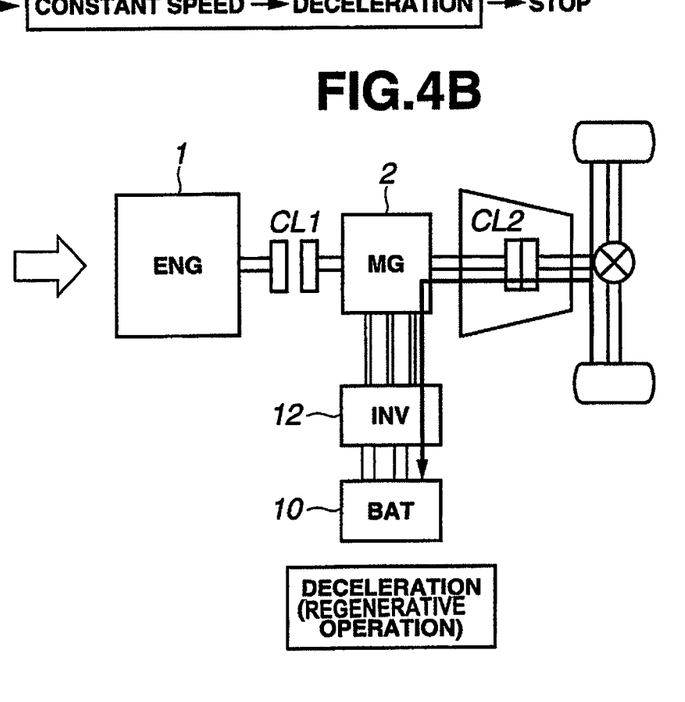

To aid the understanding of the invention, each scenario of clutch engagement and disengagement of the hybrid vehicle having the first and second clutches CL1, CL2 shown in FIG. 1 is explained. As shown in FIGS. 4A and 4B, this hybrid vehicle has the engine 1, the first clutch CL1, the second clutch CL2, the motor/generator 2, the inverter 12 and the battery 10. In the following drawings as well, the same component is denoted by the same reference sign. At a stop state, the first clutch CL1 is disengaged, and the second clutch CL2 is engaged. During acceleration, DC power of the battery 10 is converted to three-phase AC current through the inverter 12 to rotate the motor/generator 2; a driving force produced by this rotation is then transmitted to the driving wheel via the second clutch CL2.

FIGS. 4A and 4B explain the clutch engagement and disengagement in operating conditions from a constant speed (FIG. 4A) to deceleration (FIG. 4B). As shown in FIG. 4A, the vehicle is in a state in which each of the first and second clutches CL1, CL2 is completely engaged. The vehicle travels at the constant speed with an engine torque transmitted to the driving wheel through the first clutch CL1, the motor/generator 2 and the second clutch CL2. As a matter of course, since the vehicle is a hybrid vehicle, at this time a motor torque can be supplied besides the engine torque, or the vehicle could travel by only the motor torque with the fuel supply to the engine side stopped. As shown in FIG. 4B, when the accelerator pedal is released from such constant speed, in a case where the SOC is in a normal condition the drive shifts to the coasting drive in the EV mode. The first clutch CL1 is disengaged, and the motor/generator 2 works as a power generator. The AC power is converted to DC power through the inverter 12 and charges the battery 10. That is to say, at deceleration, a regenerative operation in which the battery 10 is charged is operated.

Figure 5A:
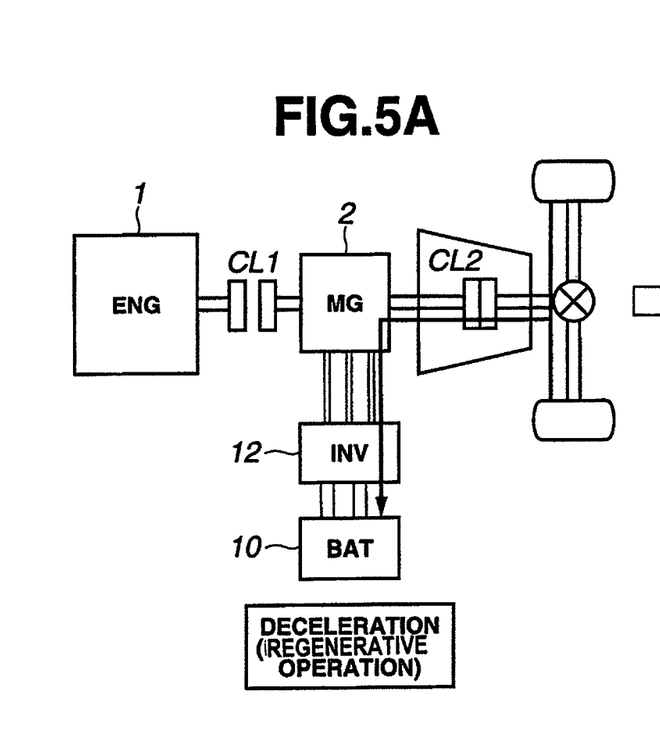
FIGS. 5A and 5B are drawings explaining engagement/disengagement of the clutch in a case where operation shifts to a coasting operation in an engine brake drive mode at a high SOC during the deceleration.
Figure 5B:
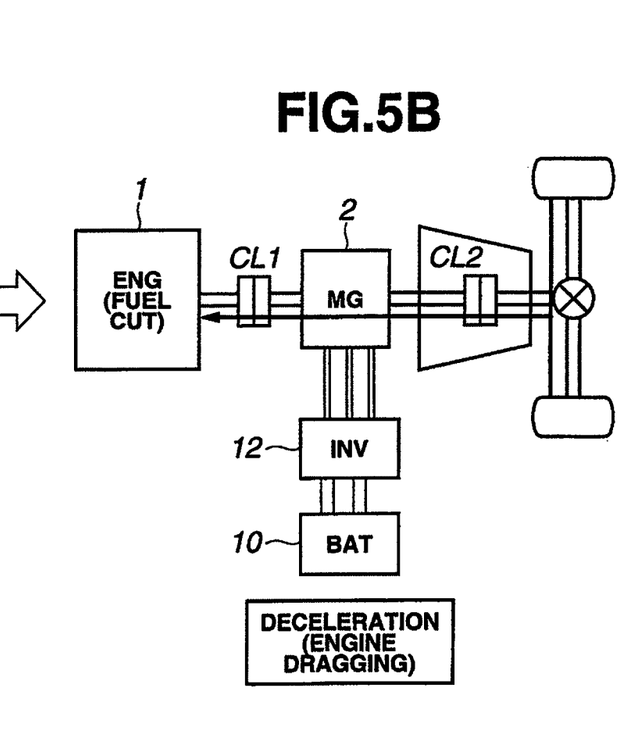

FIGS. 5A and 5B explain the clutch engagement and disengagement in operating conditions where the drive shifts to the coasting operation in the engine brake drive mode under a high SOC state during deceleration. FIG. 5A is the coasting drive in the EV mode explained above in FIG. 4B. In a case where the battery 10 is in the high SOC state (a fully charged condition and a charge prohibition state) in which the SOC exceeds the specified threshold charge value when the regenerative operation to the battery 10 is operated while being decelerated or when the accelerator pedal is released, in order to perform the deceleration without regenerating the power to the battery 10, as shown in FIG. 5B, the drive shifts to the coasting drive in the engine brake drive mode. The first clutch CL1 is engaged, and the operation in which the engine is dragged with no fuel supply to the engine 1 is carried out. That is to say, the coasting drive is performed by the engine brake.

Figure 6A:
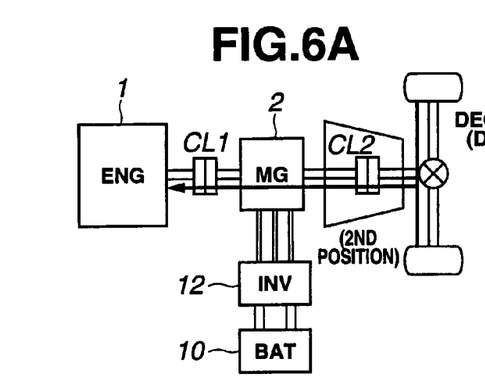
FIGS. 6A to 6D are drawings explaining engagement/disengagement of the clutch in a case where the operation shifts to the deceleration (downshift) and also re-acceleration from the coasting operation in the engine brake drive mode at the high SOC.
Figure 6B:
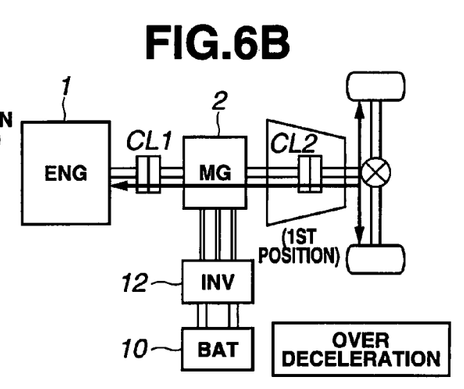
Figure 6C:
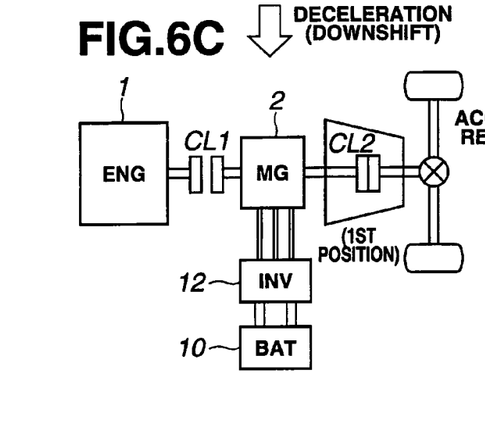
Figure 6D:
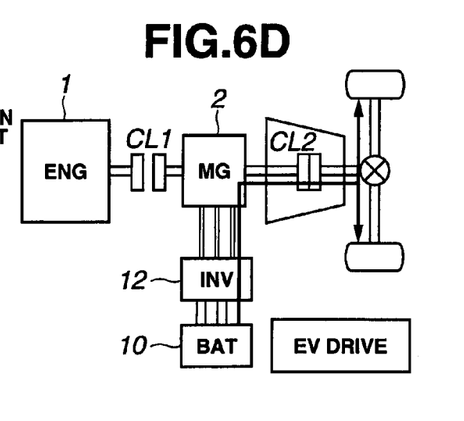

FIGS. 6A through 6D explain the clutch engagement and disengagement in operating conditions where the operation shifts from the coasting drive in the engine brake drive mode at the high SOC to the deceleration (downshift) or to re-acceleration. FIG. 6A is the coasting drive in the engine brake drive mode explained above in FIG. 5B. At the coasting drive in the engine brake drive mode shown in FIG. 6A, the downshift occurs in accordance with the decrease of the vehicle speed. According to an ordinary downshift technique, FIG. 6A changes to FIG. 6B by the deceleration, and the shift position downshifts to a low speed shift position of high deceleration, thus an over-deceleration state arises. On the other hand, according to embodiments of the invention, since the first clutch CL1 is disengaged during the downshift as shown in FIG. 6B, shock of the disengagement can be lessened. Furthermore, since an engagement or connection with the engine, which causes the over-deceleration, is released, there is no over-deceleration. Moreover, in such scenes, re-acceleration is often performed. In this case, as shown in FIG. 6D, the drive can shift to the EV drive without additional clutch control.

Modifications and variations of the embodiments described above will occur to those skilled in the art in light of the above teachings. For instance, a function that resides in each component or each section can be rearranged within logical limits.

In the illustrated embodiment, an operating condition where the first clutch CL1 is disengaged in synchronization with the downshift from $2^{nd} \rightarrow 1^{st}$ is explained. However, the invention is not limited to this situation. For instance, where the transmission ratio of the $2^{nd}$ shift position is sufficiently high, the first clutch CL1 could be disengaged in synchronization with the downshift of $3^{rd} \rightarrow 2^{nd}$, and even in this case, the same effects as the above embodiments can be obtained. Furthermore, in a case where a correspondence between the vehicle speed and the downshift is correctly or exactly set, instead of the state of the downshift, it could be possible that the first clutch CL1 is disengaged in synchronization with the vehicle speed by which the downshift is performed.

The above described embodiments have been described in order to allow easy understanding of the present invention, and do not limit the present invention. On the contrary, the invention is intended to cover various modifications and equivalent arrangements included within the scope of the appended claims, which scope is to be accorded the broadest interpretation so as to encompass all such modifications and equivalent structures as is permitted under the law.

What is claimed is:

1. A control apparatus for a hybrid vehicle including an engine, a motor/generator, a first clutch that transmits and disconnects torque between the engine and the motor/generator by engagement and disengagement of the first clutch and an automatic transmission disposed between the motor/generator and a driving wheel, the control apparatus comprising:
    a controller configured to maintain engagement of the first clutch to perform a vehicle coasting drive while dragging the engine at a time of coasting deceleration; to control the automatic transmission to perform a downshift process; and to disengage the first clutch during the downshift process.

2. The method according to claim 1 wherein the hybrid vehicle includes a battery that supplies the motor/generator with power and is charged with power generated by the motor/generator, the method further comprising:
    performing the vehicle coasting drive while dragging the engine at the time of coasting deceleration when a state of charge of the battery charge is greater than a predetermined threshold charge value.

3. The control apparatus according to claim 1 wherein:
    the controller is further configured to control the automatic transmission to perform the downshift process in accordance with a decrease of a vehicle speed.

4. The control apparatus according to claim 3, wherein:
    the controller is further configured to disengage the first clutch during the downshift process when the automatic transmission downshifts to a shift position of a largest transmission ratio in accordance with the decrease of the vehicle speed at the vehicle coasting drive in which the engine is dragged with the first clutch engaged.

5. The control apparatus according to claim 1, wherein:
    the downshift process includes a first torque phase, during which the controller executes a first torque control of the motor/generator, and an inertia phase, during which the controller executes a rotation speed control of the motor/generator; and
    the controller is further configured to disengage the first clutch in response to switching from the first torque control to the rotation speed control.

6. The control apparatus according to claim 5, wherein:
    the downshift process further includes a second torque control phase, during which the controller performs a second torque control of the motor/generator; and
    the controller is further configured to maintain disengagement of the first clutch and shift from the rotation speed control of the motor/generator to the second torque control of the motor/generator after the inertia phase is completed and the second torque phase begins.

7. The control apparatus according to claim 1 wherein the hybrid vehicle includes a battery that supplies the motor/generator with power and is charged with power generated by the motor/generator; and
    wherein the controller is further configured to perform the vehicle coasting drive while dragging the engine at the time of coasting deceleration when a state of charge of the battery charge is greater than a predetermined threshold charge value.

8. The control apparatus according to claim 7, wherein:
the controller is further configured to control the automatic transmission to perform the downshift process in accordance with a decrease of a vehicle speed.

9. The control apparatus according to claim 8, wherein:
the controller is further configured to disengage the first clutch during the downshift process when the automatic transmission downshifts to a shift position of a largest transmission ratio in accordance with the decrease of the vehicle speed at the vehicle coasting drive in which the engine is dragged with the first clutch engaged.

10. The control apparatus according to claim 7, wherein:
the downshift process includes a first torque phase, during which the controller executes a first torque control of the motor/generator, and an inertia phase, during which the controller executes a rotation speed control of the motor/generator; and
the controller is further configured to disengage the first clutch in response to switching from the first torque control to the rotation speed control.

11. The control apparatus according to claim 10, wherein:
the downshift process further includes a second torque control phase, during which the controller performs a second torque control of the motor/generator; and
the controller is further configured to maintain disengagement of the first clutch and shift from the rotation speed control of the motor/generator to the second torque control of the motor/generator after the inertia phase is completed and the second torque phase begins.

12. A method of controlling a hybrid vehicle including an engine, a motor/generator, a first clutch that transmits and disconnects torque between the engine and the motor/generator by engagement and disengagement of the first clutch and an automatic transmission disposed between the motor/generator and a driving wheel, the method comprising:
maintaining engagement of the first clutch to perform a vehicle coasting drive while dragging the engine at a time of coasting deceleration;
controlling the automatic transmission to perform a downshift process; and
disengaging the first clutch during the downshift process.

13. The method according to claim 12 wherein controlling the automatic transmission to perform the downshift process comprises:
executing a first torque phase by controlling a torque of the motor/generator; and
executing an inertia phase by controlling a rotation speed of the motor/generator after executing the first torque phase; and wherein disengaging the first clutch during the downshift process comprises:
disengaging the first clutch responsive to switching from the first torque phase to the inertia phase.

14. The method according to claim 13 wherein controlling the automatic transmission to perform the downshift process further comprises:
executing a second torque control phase by controlling the torque of the motor/generator after executing the inertia phase, the method further including:
maintaining disengagement of the first clutch after the second torque phase begins.

15. The method according to claim 12 wherein controlling the automatic transmission to perform the downshift process occurs in accordance with a decrease of a vehicle speed.

16. The method according to claim 15 wherein disengaging the first clutch during the downshift process occurs when the automatic transmission downshifts to a shift position of a largest transmission ratio in accordance with the decrease of the vehicle speed at the vehicle coasting drive in which the engine is dragged with the first clutch engaged.

17. A control apparatus for a hybrid vehicle including an engine, a motor/generator, a first clutch that transmits and disconnects torque between the engine and the motor/generator by engagement and disengagement of the first clutch and an automatic transmission disposed between the motor/generator and a driving wheel, the control apparatus comprising:
means for maintaining engagement of the first clutch to perform a vehicle coasting drive while dragging the engine at a time of coasting deceleration;
means for controlling the automatic transmission to perform a downshift process; and
means for disengaging the first clutch during the downshift process.

* * * * *